(12) United States Patent
Factor et al.

(10) Patent No.: US 10,216,581 B2
(45) Date of Patent: *Feb. 26, 2019

(54) AUTOMATED DATA RECOVERY FROM REMOTE DATA OBJECT REPLICAS (71) Applicant: International Business Machines Corporation, Armonk, NY (US)

(72) Inventors: Michael E. Factor, Haifa (IL); David Hadas, Zichron Yaakov (IL); Elliot K. Kolodner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 14/964,073

(22) Filed: Dec. 9, 2015

(65) Prior Publication Data

US 2016/0085651 A1 Mar. 24, 2016

Related U.S. Application Data (63) Continuation of application No. 14/058,293, filed on Oct. 21, 2013, now Pat. No. 9,264,494.

(51) Int. Cl.
*G06F 11/00* (2006.01)
*G06F 11/14* (2006.01)
(Continued)

(52) U.S. Cl.
CPC ......... *G06F 11/1451* (2013.01); *G06F 3/064* (2013.01); *G06F 3/067* (2013.01);
(Continued)

(58) Field of Classification Search
CPC combination set(s) only.
See application file for complete search history.

(56) References Cited

U.S. PATENT DOCUMENTS 6,480,944 B2 * 11/2002 Bradshaw ................. G06F 8/71
711/118
7,159,150 B2 * 1/2007 Kenchammana-Hosekote ...........
G06F 11/0727
714/4.3
(Continued)

FOREIGN PATENT DOCUMENTS

CN 1801107 A 7/2006
CN 1836217 A 9/2006
(Continued)

OTHER PUBLICATIONS

Oracle, "Failover and Replication in a Cluster", 2013, http://docs.oracle.com/cd/E13222_01/wls/docs90/cluster/failover.html.
(Continued)

*Primary Examiner* — Amine Riad
(74) *Attorney, Agent, or Firm* — Nathan M. Rau (57) ABSTRACT

Machines, systems and methods for recovering data objects in a distributed data storage system, the method comprising storing one or more replicas of a first data object on one or more clusters in one or more data centers connected over a data communications network; recording health information about said one or more replicas, wherein the health information comprises data about availability of a replica to participate in a restoration process; calculating a query-priority for the first data object; querying, based on the calculated query-priority, the health information for the one or more replicas to determine which of the one or more replicas is available for restoration of the object data; calculating a restoration-priority for the first data object based on the health information for the one or more replicas; and restoring the first data object from the one or more of the available replicas, based on the calculated restoration-priority.

13 Claims, 6 Drawing Sheets

(51) Int. Cl.
*H04L 29/08* (2006.01)
*G06F 11/16* (2006.01)
*G06F 11/20* (2006.01)
*G06F 17/30* (2006.01)
*G06F 3/06* (2006.01)

(52) U.S. Cl.
CPC .......... *G06F 3/0619* (2013.01); *G06F 3/0647* (2013.01); *G06F 11/1662* (2013.01); *G06F 11/2069* (2013.01); *G06F 11/2094* (2013.01); *G06F 17/30424* (2013.01); *H04L 67/1097* (2013.01); *G06F 2201/85* (2013.01)

(56) References Cited

U.S. PATENT DOCUMENTS

| | | | | |
|---|---|---|---|---|
| 7,305,675 | B1 * | 12/2007 | Gulick | G06F 9/4812 710/19 |
| 7,320,088 | B1 * | 1/2008 | Gawali | G06F 11/1662 709/219 |
| 7,392,421 | B1 * | 6/2008 | Bloomstein | G06F 11/1482 714/4.4 |
| 7,526,622 | B1 | 4/2009 | Bonwick et al. | |
| 8,074,103 | B2 * | 12/2011 | Dilman | G06F 11/0727 707/690 |
| 8,074,107 | B2 * | 12/2011 | Sivasubramanian | G06F 11/2025 714/11 |
| 8,112,423 | B2 * | 2/2012 | Bernhard | G06F 11/08 707/610 |
| 8,286,026 | B2 * | 10/2012 | Rao | G06F 11/2028 714/4.1 |
| 8,341,457 | B2 * | 12/2012 | Spry | G06F 11/1092 714/15 |
| 8,386,733 | B1 * | 2/2013 | Tsaur | G06F 11/1458 711/162 |
| 8,543,862 | B2 * | 9/2013 | Dilman | G06F 11/0727 707/690 |
| 8,738,575 | B2 * | 5/2014 | Anglin | G06F 11/1469 707/640 |
| 8,738,854 | B2 | 5/2014 | Iida | |
| 2003/0204786 | A1 | 10/2003 | Dinker et al. | |
| 2004/0078397 | A1 | 4/2004 | Mehta | |
| 2005/0177267 | A1 | 8/2005 | Chang et al. | |
| 2007/0294319 | A1 | 12/2007 | Mankad et al. | |
| 2008/0140944 | A1 | 6/2008 | Arakawa et al. | |
| 2009/0094425 | A1 | 4/2009 | Winokur | |
| 2009/0313503 | A1 | 12/2009 | Atluri et al. | |
| 2010/0257403 | A1 | 10/2010 | Virk et al. | |
| 2012/0124046 | A1 | 5/2012 | Provenzano | |
| 2012/0124105 | A1 | 5/2012 | Provenzano | |
| 2012/0144234 | A1 | 6/2012 | Clark et al. | |
| 2013/0290772 | A1 | 10/2013 | Ballard | |
| 2013/0290775 | A1 | 10/2013 | Tucek et al. | |
| 2014/0040206 | A1 | 2/2014 | Ramakrishnan et al. | |
| 2014/0149357 | A1 | 5/2014 | Gupta | |
| 2014/0215265 | A1 | 7/2014 | Mohanta et al. | |
| 2015/0113324 | A1 | 4/2015 | Factor et al. | |
| 2015/0143064 | A1 | 5/2015 | Bhargava | |

FOREIGN PATENT DOCUMENTS

| | | |
|---|---|---|
| CN | 101449269 A | 6/2009 |
| CN | 102629223 A | 8/2012 |
| CN | 102937922 A | 2/2013 |
| CN | 103034567 A | 4/2013 |
| CN | 103229165 A | 7/2013 |

OTHER PUBLICATIONS

IBM, "Modular Single Failure Recovery Update System", An IP.com Prior Art Database Technical Disclosure, 2007.
Derringer, P. "Steel eye Combines Linux Server Failover and Remote Data Replication", Search Enterprise Linux, TechTarget, Oct. 2008, http://searchenterpriselinux.techtarget.com/news/1334741/SteelEye-combines-Linux-server-failoverand-remote-data-replication.
Factor et al., "Automated Data Recovery from Remote Data Object Replicas," U.S. Appl. No. 14/964,021, filed Dec. 9, 2015.
Factor et al., "Automated Data Recovery from Remote Data Object Replicas," U.S. Appl. No. 14/964,050, filed Dec. 9, 2015.
Factor et al., "Automated Data Recovery from Remote Data Object Replicas," U.S. Appl. No. 14/964,085, filed Dec. 9, 2015.

* cited by examiner

AUTOMATED DATA RECOVERY FROM REMOTE DATA OBJECT REPLICAS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to data recovery from remotely stored data replicas and, more particularly, to a system and method for dispersing and storing data across a plurality of data centers for the purpose of data recovery.

BACKGROUND

Mass-scale data storage systems are desirable for their sheer size and ability to process and store vast amounts of data. Generally, these mass-scale systems are built to include a plurality of data centers located remotely from one another. Each data center is usually comprised of a plurality of independent clusters wherein each cluster has a plurality of nodes. These nodes are coupled to each other by way of a data network infrastructure and are ideally independent from each other insofar as the data is stored on storage media that are separately maintained.

The purpose for keeping the data centers at remote sites is to mitigate the risk of damage to multiple data centers in case of a catastrophic event (e.g., flood, earthquake, or tornado). In the event that a data center experiences the loss of a data object or a replica, the recovery process requires locating a surviving replica from which to replicate or restore the lost data. Accordingly, data centers are typically built with multiple local replicas per cluster. This feature allows a cluster to self-recover from a fault using the surviving local replicas.

If all local replicas are lost, the data may be recovered from one or more remotely stored replicas. Such remote recovery is currently accomplished via a manual process, often requiring administrative assistance. Due to the size and distribution of resources in a mass-scale data storage system, information regarding the location and availability of replicas across the plurality of data centers and clusters is not readily scalable and, in turn, is unavailable to all nodes across the plurality of data centers.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for recovering data objects in a distributed data storage system are provided. The method comprises storing one or more replicas of a first data object on one or more clusters in one or more data centers connected over a data communications network; recording health information about said one or more replicas, wherein the health information comprises data about availability of a replica to participate in a restoration process; calculating a query-priority for the first data object; querying, based on the calculated query-priority, the health information for the one or more replicas to determine which of the one or more replicas is available for restoration of the object data; calculating a restoration-priority for the first data object based on the health information for the one or more replicas; and restoring the first data object from the one or more of the available replicas, based on the calculated restoration-priority.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1A:
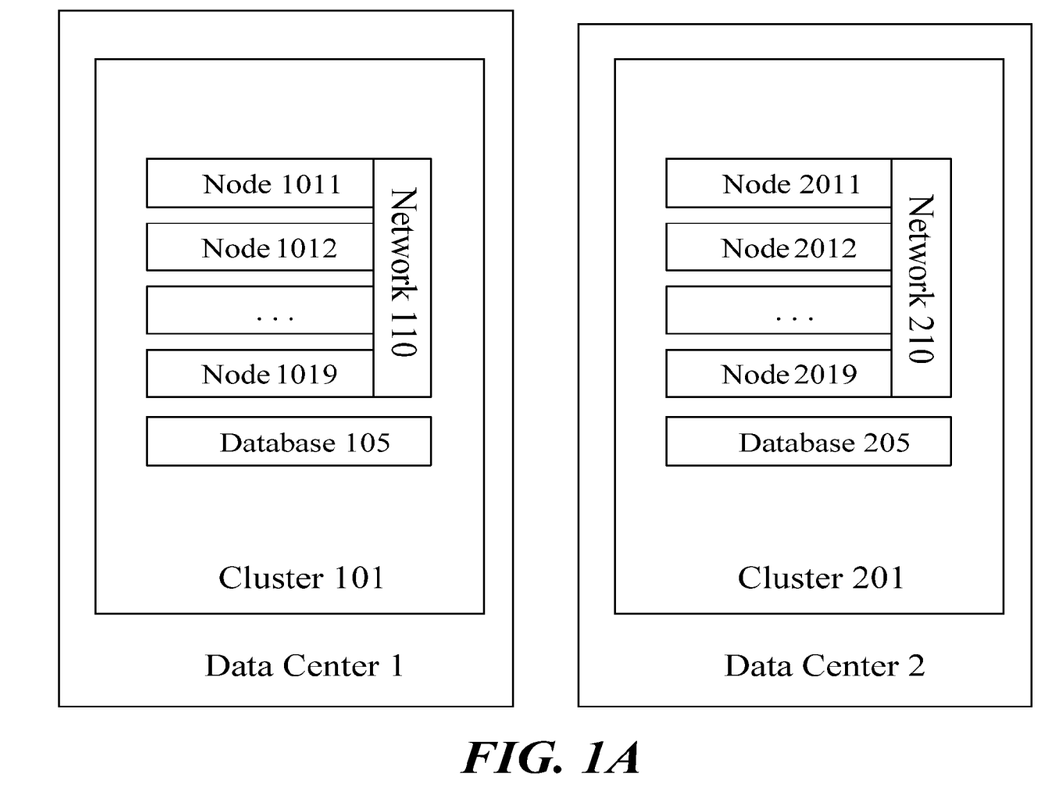
FIGS. 1A and 1B illustrate block diagrams of exemplary system infrastructure for storing and recovering data in a distributed data communications network, in accordance with one or more embodiments.

Referring to FIG. 1A, a computing environment is illustrated that enables data recovery in a data storage system that replicates copies of data objects (i.e., replicas) across multiple data centers. As shown, a plurality of data centers (e.g., data center 1, data center 2, etc.) may be implemented, where a data center is comprised of one or more clusters (e.g., cluster 101, cluster 201, etc.). A data center may also comprise one or more networks (e.g., network 110, network 210, etc.) having one or more nodes (e.g., nodes 2011, 2012, etc.). A remote or local database (e.g., database 105, database 205, etc.) in addition to power supplies and cooling systems (not shown) may be also included in a data center.

Figure 1B:
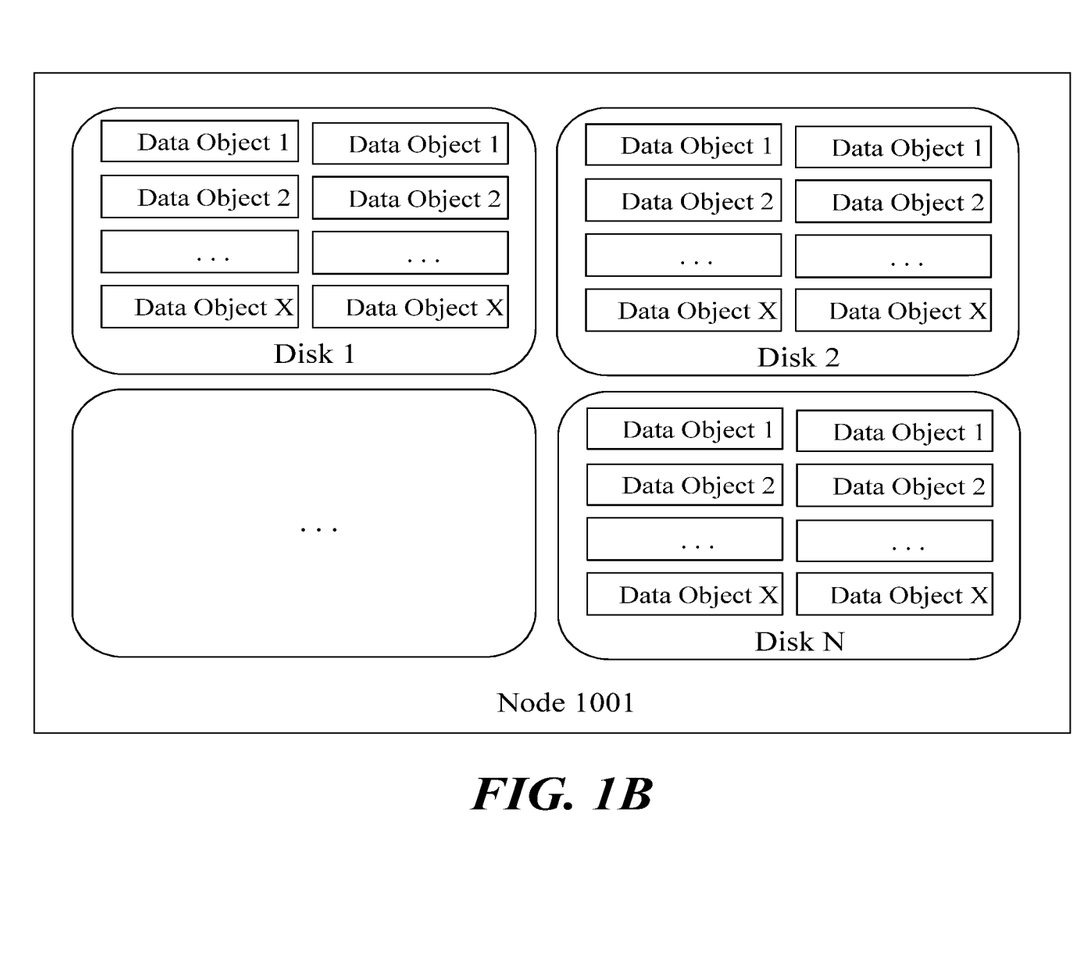

Referring to FIG. 1B, a network node 1001 is illustrated which includes a plurality of storage media (e.g., disks 1 through N) on which multiple data objects 1 through X may be stored. In accordance with one embodiment, a robust, reliable and efficient data recovery system is implemented in which the overall number of data object replicas stored on a single node in the network is limited to a minimum where possible by dispersing and storing data objects on remote nodes or clusters in a distributed data storage system. In this manner, if a fault results in loss, damage, or otherwise unavailability of a replica at a local cluster, the likelihood of recovering the data is higher if one or more replicas of the data are stored in remote clusters, because the probability of the remote cluster having been affected by the same local fault is minimal.

Figure 2:
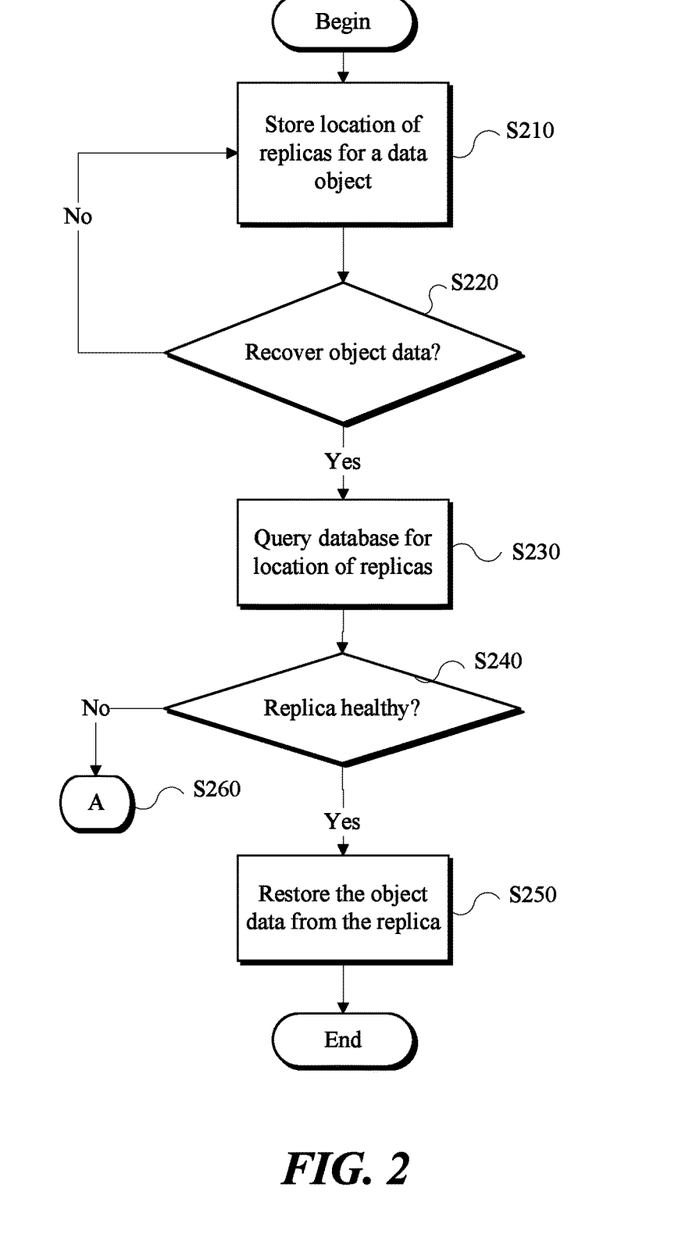
FIGS. 2 and 3 are flow diagrams illustrating exemplary methods for automated data recovery from remotely stored replicas of lost data objects, in accordance with one embodiment.

Referring to FIG. 2, in accordance with one implementation, a database may be configured to communicate with a local cluster to store and provide the placement of data object replicas for one or more data objects (S210), where the data objects are stored on one or more network nodes in the local cluster. For example, a database may store information about data objects to indicate that a data object 1 is stored on disk 1, in node 1001, in cluster 101 of data center 1. Further, additional information may be stored in the database in association with a data object to indicate the locations of one or more replicas of said data object within the local data center and across remote data centers in a distributed storage network. Thus, the database may include a record that associates a local data object with its corresponding remote replicas in clusters 1 through N.

A data object may be deemed faulty if at least one replica of the data object is lost or damaged. If a faulty data object is to be restored or recovered (S220), the database record for the faulty data object may be queried to determine the list of clusters 1 through N that hold replicas of the faulty data object (S230). Once the location or locations of the replicas are determined, optionally, a plurality of parallel processes 1 through N may be initiated in order to communicate with the corresponding clusters on which the remote replicas 1 through N are stored. The purpose of such query may be to, for example, determine health data about the availability of a replica for the purposes of recovery (S240). Health data may be in form of an indicator (e.g., a logical flag, such as a Boolean operand) associated with the replica for indicating whether the replica is available on the corresponding disk, node or cluster, whether local or remote.

Accordingly, health data for a replica may be utilized to determine whether the faulty data object may be successfully recovered from that replica. If a healthy replica is available, then the data object may be restored from that replica (S250), otherwise remedial measures may be taken (S260). For example, if a remote node on which a replica of a faulty data object is stored is conducting a replica recovery process for the same faulty data object, then the health data for the target replica would indicate that the target replica is not available for the purpose of the replica recovery. Health data for a replica in various distributed data centers may also, optionally, include information about the number of replicas available for a certain data object. The health data may be analyzed to calculate a recovery plan based on recovery criteria, which may include the risk of loss based on the number or the location of available replicas on local or remote clusters.

For example, to define a recovery criteria or plan, a priority function may be used to determine the priority of recovering a first faulty data object over a second faulty data object based on the probability of losing the first faulty data object and the cost associated with losing or recovering the first faulty data object as compared to the second faulty data object. Depending on implementation, for example, it may be desirable to recover faulty data objects with fewer numbers of local duplicates first, over faulty data objects that have a higher number of local duplicates. As another example, it may be desirable to recover faulty data objects that are rated as being stored on less secure or less reliable data storage media first. Other recovery plans with alternative priority schemes may be also implemented in accordance with factors that may suggest or assign higher importance or cost with the recovery of certain data objects.

In accordance with one embodiment, an exemplary priority function $P(D)=Func(N(D),C(D),n)$ may be used for recovery of a faulty data object from one or more replicas in a distributed network, where:

D represents a data object with multiple replicas in multiple clusters;

L(D) represents the local replica of D;

$R(D)_i$, i=1 . . . n, where "i" and "n" are natural numbers, with a remote replica indexed i of D out of "n" remote replicas;

H(D)i represents the health of $R(D)_i$ at the time a recovery query is run, wherein ad-hoc information provided by a remote cluster may indicate that a replica is "Available" or "Unavailable", for example;

N(D) represents the number of remote replicas for which $H(D)_i$="Available", for example;

C(D) represents the cost of losing N replicas of D;

P(D) represents the priority given by the system for the recovery operation of D; and S(D) represents a source of the remote replica of D that has H(D)i ="Available", for example, and was chosen by the system from which to copy from.

Figure 3:
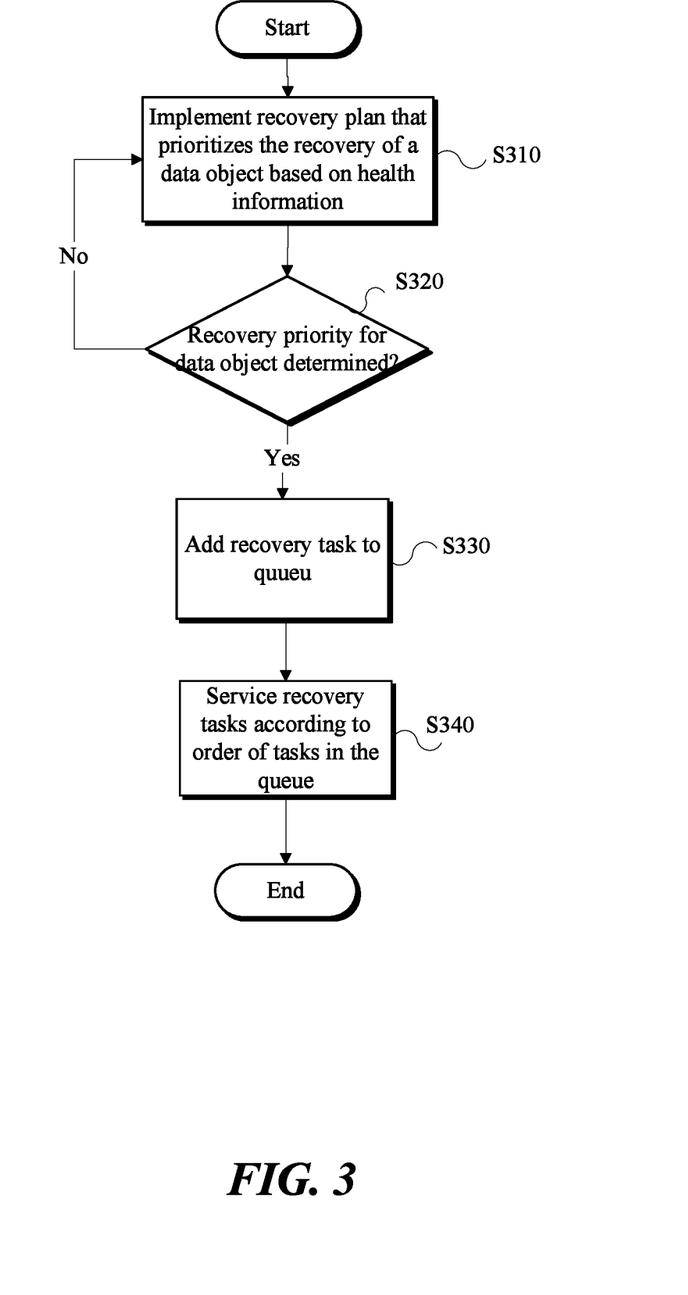

Referring to FIG. 3, in accordance with one embodiment, the recovery plan may be implemented using a recovery priority queue, where the relative priority of recovery of a data object is determined from the analysis of the health information associated with the data object and other factors noted above (S310). Once the priority of recovery for a data object is determined (S320), for example, based on a priority function such as the one noted above, then a corresponding recovery task may be added to the recovery priority queue (S330). The recovery tasks in the queue may be serviced according to the order of the tasks in the queue (S340). It is noteworthy that, depending on implementation, the recovery requests added to the recovery priority queue may be added in real time as information noted above about a damaged, or otherwise unavailable data object (i.e., a faulty data object) and its corresponding N replicas is obtained and analyzed.

In one example scenario, a request for recovery of a faulty data object may be added to the recovery priority queue as soon as possible and, optionally, prior to having determined the recovery priority for the faulty data object. For example, a first recovery request for a first data object and a second recovery request for a second data object may be added to the queue, with the first recovery request being scheduled ahead of the second recovery request. If the recovery of the second data object is determined to be of a higher priority over the recovery of the first data object (e.g., based on the results of the priority function), the second recovery request may be moved to a position in the queue that is ahead of the first recovery request.

In another example, recovery requests may be added to the queue after the priority is calculated. In this example, first priority for a first recovery request for a first data object may be calculated first and added to the queue and at some later time, a second priority which is higher than the first priority may be calculated for a second recovery request for a second data object such that the second request would be scheduled before the first request. In one implementation, the recovery for the first data object may not be interrupted, if the processing of the first recovery request has already started. As such, the recovery process may be optimized without slowing down the recovery requests that have already started processing, unless a certain predetermined set of conditions are met, for example.

In accordance with one embodiment, one or more factors may be considered in calculating a recovery plan for the purpose of introducing efficiency into the replica recovery process. As a simplified example, consider a scenario in which it may be determined that out of 10 faulty data objects, healthy replicas for 7 of the 10 objects may be recovered from the same set of remote clusters. A naive approach, in this example scenario, would be to submit 10 separate queries to determine the health or availability of replicas for each of the 10 faulty data objects from 10 separate remote clusters, followed by 10 independent retrieval requests to recover the local replica of the 10 faulty objects, possibly from 10 different remote clusters. It will be appreciated that such naive approach is associated with a large amount of overhead and is costly.

In one embodiment, health information stored in a (desirably local) recovery database about the replicas may be analyzed to determine the location of replicas available on a local or remote node or cluster. In the above example, 7 out of 10 replicas may be stored on a single local or remote node or cluster. It is noteworthy that at this point, while the location of the replicas is known, the actual health of the replicas may not be known. As such, health inquiries may need to be submitted for the 10 replicas to determine which of the 10 replicas may be suitable for the purpose of recovery. For efficiency, a health inquiry for the 7 replicas that reside on the same node may be submitted in a single inquiry (e.g., instead of submitting 7 separate inquiries).

In this example, at a health verification stage, responses may be received to the health inquiries submitted. The response would indicate the health of the 10 replicas. Desirably, in one implementation, a single response is received to the single inquiry for the 7 replicas to indicate the health level for one or more (and desirably all) the 7 replicas. Additional queries may be submitted to other remote clusters for health information of replicas on other nodes. For example, 3 separate health inquiries may have to be submitted to 3 separate nodes if the remaining 3 out of the 10 replicas are on 3 separate nodes. Note also that each faulty object may have multiple replicas and that inquiries needs to be sent to one or more clusters in which such replicas should exist to inquire the health of the object.

Once the health data for the 10 replicas is collected, the recovery priority for the faulty object may be calculated and a list of possible options for recovery of the object may be determined. In the above example, if 4 of the faulty objects being recovered have the same priority, and replicas for the 4 faulty objects may be retrieved from the same remote cluster, then a single recovery request may be submitted for those 4 faulty objects. That is, instead of issuing 4 independent retrieval requests, to the same remote cluster, one retrieval request is submitted. This implementation would save network and processing bandwidth and overhead costs associated with processing the recovery inquiries and requests.

The cluster recovering the 10 faulty objects therefore may design an efficient recovery scheme for the 10 faulty objects by grouping retrieval requests that share the same or similar priority and may be retrieved from the same source cluster using the information gathered during the health verification stage. Such grouped retrieval requests with their priority may be added to the priority queue once their priority is determined as described above. In one embodiment, the health verification stage and the recovery stage may be intertwined and use the same priority queue such that health verification stage tasks are assigned a priority defined by the apriority knowledge obtained from the database (e.g., based on the number of potential replicas that the faulty object may still have and the cost of losing such object). The recovery task priority may be calculated based on the responses provided at the health verification stage as provided above.

In accordance with one embodiment, if the replica recovery process from one or more identified nodes or clusters is unsuccessful, the replica recovery process may be repeated by returning to a health verification stage—i.e. by querying the health of the replicas by submitting the recovery inquiry and request to other nodes or clusters that may have replicas of the faulty data objects, even where said nodes or clusters do not provide the most optimal recovery process as calculated. Alternatively, other sources that were calculated at the previous health verification stage may be used to obtain the faulty object, while optionally adjusting the recovery request priority accordingly.

In summary, the following processes may be implemented for the purpose of recovery:
1. Identify a faulty data object by determining that at least N replicas of a data object are lost.
2. Queue Task 1 (Query health data & calculate priority):
   2.1 Query multiple nodes about the health of respective replicas for the faulty object,
   2.2 Calculate the priority of recovery task for the faulty object and decide the location from which to recover the replica, and
   2.3 Queue Task 2 to perform the recovery task based on the calculated priority for the faulty object.
3. Task 2 (Recovery):
   3.1 Try to recover from a replica based on health data,
   3.2 If fail to recover: Queue Task 1 to query the health of replicas for the faulty object again. Depending on implementation, the priority of recovery for the faulty object may or may not be calculated again, according to one or more factors (e.g., if the priority calculation is independent of the health of the replicas).

As noted earlier, the recovery tasks may be prioritized based on the probability associated with the risk of losing one or more data replicas associated with a faulty data object. Further, a parallel recovery configuration may be implemented such that (a) some or optionally all nodes of a cluster may participate in the replica recovery process, (b) multiple processes may run in parallel to assist with the recovery from multiple available replicas, and (c) replicas may be grouped to speed up mass recovery processes.

Advantageously, the disclosed parallel replica recovery process from a focused group of nodes or clusters in a distributed data storage environment scales well in larger data storage systems and may be utilized to support an on-going replica recovery process for recovering a relatively large number of replicas across a large-scale data storage system. In accordance with one embodiment, metadata including a replica's health information or availability status may be maintained in a database at the cluster level per replica (e.g., as opposed to the node level), such that the metadata may be accessed even if the replica data is lost. Such metadata may include the list of candidate clusters from which the replica may be recovered, optionally, the cost of losing the replicated data or the cost of replicating from each respective candidate cluster.

In one embodiment, the replica metadata may be replicated more times than the data object replica itself, allowing the replica metadata to survive more faults than the replica, for example. A cluster may contain one or more unprotected copies of the replica and one or more protected copies of an object's metadata, either via encoding (to achieve redundancy) or via replication. Depending on implementation, the priority of recovery for a data object or of obtaining the health of a faulty object during a health verification stage may be determined based upon, for example, at least one or more of the following:

the number of replicas lost for a data object,
the number of replicas remaining for a data object (e.g., whether de-facto replicas or in theory), and
the cost of losing one or more replicas of the data object.

If a candidate replica chosen or located for the purpose of restoration of a respective data object is deemed unavailable, the recovery priority for the data object may be determined as if the respective set of replica held by that candidate cluster is lost. In accordance with one embodiment, a designated cluster may be selected from one of a candidate set of clusters, if the designated cluster responds that the cluster contains a healthy replica. A candidate cluster may report its current state (e.g., the available resources), where a designated cluster may be determined based on the availability of its resources. If a cluster is provided with data about the cost of recovery from one or more candidate clusters, a designated cluster may be selected with a lower (or lowest) associated recovery cost.

In accordance with one embodiment, a cluster may have information about local replicas of a data object such that a designated cluster for the purpose of recovery may be determined based upon whether there are additional copies of the data object replicas in the cluster. The designated cluster may be determined from among the candidate clusters that responded with the highest number of healthy replicas from the set of replicas that share the same priority, where:

priority is calculated prior to selecting the designated cluster from which a faulty data object is to be recovered, and
when the designated cluster is selected, the same designated cluster is chosen for the largest possible subset of faulty data objects that share the same priority.

For example, in Table 1 below, Cluster 2 will be chosen for replicating faulty data objects 4, 5, 6, 7 and 8. And, Cluster 1 will be chosen for replicating lost replicas 1, 2 and 3.

| replica | priority | cluster 1 | cluster 2 |
|---------|----------|-----------|-----------|
| 1 | 5 | ok | ok |
| 2 | 5 | ok | ok |
| 3 | 5 | ok | Missing |
| 4 | 7 | ok | ok |
| 5 | 7 | ok | ok |
| 6 | 7 | ok | ok |
| 7 | 7 | ok | ok |
| 8 | 7 | Missing | ok |

In accordance with one embodiment, after a failure to recover a faulty data object from a designated cluster, a new priority and a new designated cluster may be determined based on the information previously queried from the candidate clusters or by making an additional query to the candidate clusters. A list of faulty data objects or lost replicas for a data object may be determined based on metadata stored in a recovery database. The list may be processed to find a common list of candidate clusters from which a faulty data object may be restored. List of lost replicas may be first divided based on the administrative domain controlling the data such that any further recovery processing is done based on privileges belonging to the said administrative domain.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
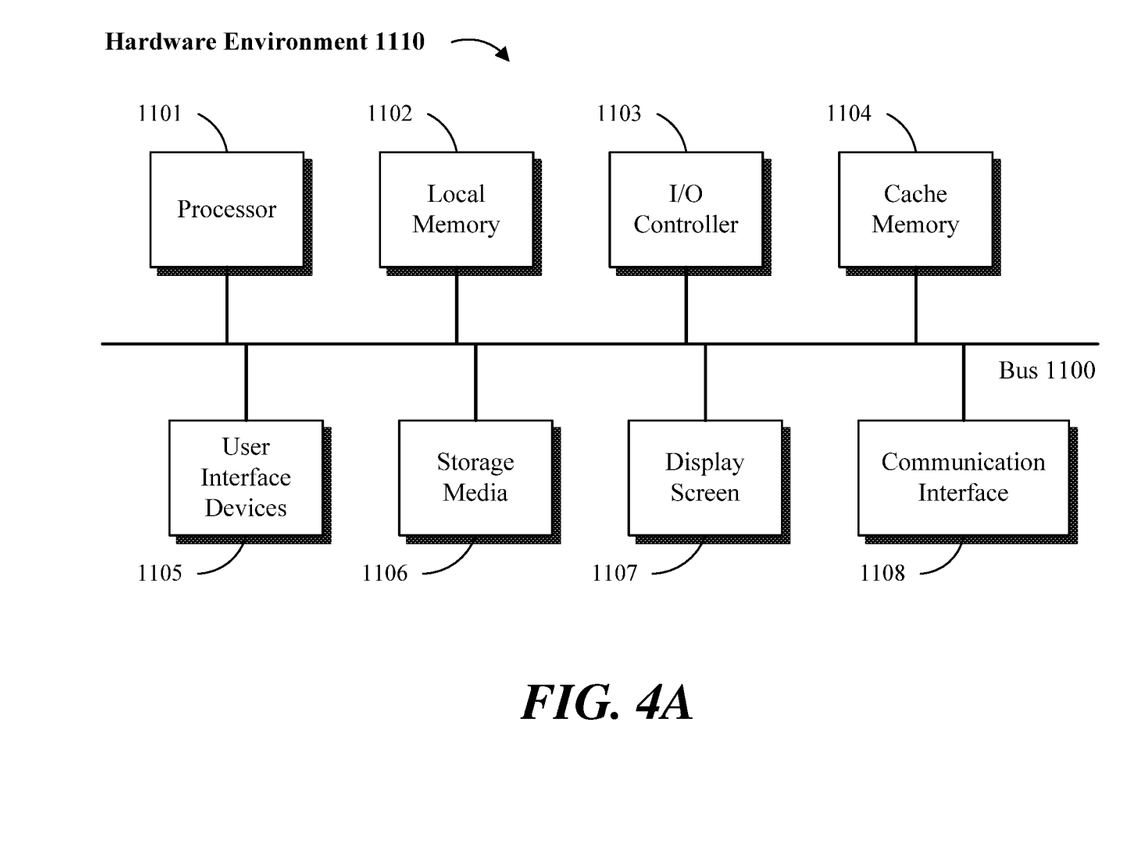
FIGS. 4A and 4B are block diagrams of hardware and software environments in which the disclosed systems and methods may operate, in accordance with one or more embodiments.
Figure 4B:
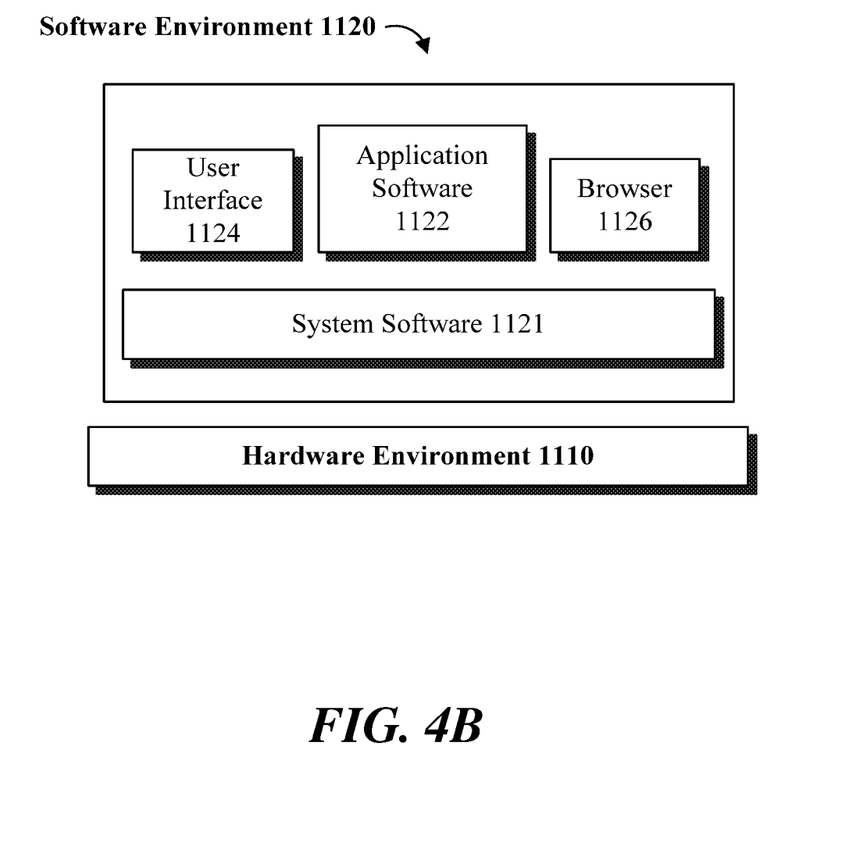

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RANI), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for recovering data objects in a distributed data storage system, the method comprising:

storing one or more replicas of a first data object on one or more clusters in one or more data centers connected over a data communications network, wherein a first data center of the one or more data centers includes a first cluster of the one or more clusters and the first cluster includes a plurality of compute nodes, the first cluster further includes a database that stores metadata concerning a replica of each data object of each of the plurality of compute nodes of the first cluster, a first compute node of the plurality of compute nodes includes the first data object, and wherein an availability status of the one or more replicas is maintained in the database at the first cluster per replica, and wherein the availability status is not maintained at the first compute node;

recording health information metadata about said one or more replicas within the database, wherein the health information comprises data about availability of a replica to participate in a restoration process;

determining that the first data object is faulty when at least one replica of the first data object is determined to be lost or damaged;

in response to determining that the first data object is faulty, determining that the first data object is to be recovered when a number of replicas of the first data object that are damaged or lost exceeds a threshold number of replicas;

in response to determining that the first data object is to be recovered, calculating a query-priority for the first data object;

querying, based on the calculated query-priority, the health information metadata within the database for the one or more replicas to determine which of the one or more replicas is available for restoration of the first data object;

calculating a restoration-priority for the first data object based on the health information metadata for the one or more replicas; and restoring the first data object from the one or more of the available replicas, based on the calculated restoration-priority and based on the availability status, wherein the restoration-priority is calculated based on a priority function $P(D)=Func(N(D),C(D),n)$, where:

D represents a data object with multiple replicas in multiple clusters;

N(D) represents number of remote replicas for which $H(D)_i$ is available;

C(D) represents cost of losing N replicas of D;

P(D) represents priority given by the system for the restoration operation of D; and Func( ) represents some function.

2. The method of claim 1, wherein the query-priority is calculated based on a second function with parameters that represent at least one of:
number of replicas of the first data object in the distributed data storage system,
projected costs associated with losing N replicas of the first data object in the distributed data storage system, or
risk of loss associated with delaying recovery of the first data object over a second data object, wherein the risk of loss is calculated based on the number of replicas or the costs of loss associated with the first and second data objects.

3. The method of claim 1, wherein the one or more data centers are located remotely from the location in which the first data object is being recovered.

4. The method of claim 1, wherein the health information comprises availability and location data about the one or more replicas.

5. The method of claim 1, wherein querying the health information of a plurality of data objects from a location is optimized by aggregating queries for at least a subset of the plurality of the data objects in a single query.

6. The method of claim 5, wherein data objects in the subset of the plurality of the data objects in the single query are associated with the same query-priority.

7. The method of claim 1, wherein the restoration of a plurality of data objects is optimized by restoring at least a subset of the plurality of the data objects from a location where a maximum collective number of the plurality of data objects have replicas, using a single restoration request.

8. The method of claim 7, wherein data objects in the subset of the plurality of the data objects restored using a single restoration request are associated with the same restoration-priority.

9. The method of claim 1, wherein the query-priority is calculated based on a second priority function $P(D)=Func(R(D),C(D),n)$, where:

D represents a data object with multiple replicas in multiple clusters;

$R(D_i)$, i=1 . . n, where "i" and "n" are natural numbers, with a remote replica indexed i of D out of n remote replicas;

C(D) represents cost of losing N replicas of D;

P(D) represents priority given by the system for the query operation of D; and

Func( ) represents some function.

10. The method of claim 1, wherein the health information for the one or more replicas is recorded by a first cluster in a database accessible by a recovery module of the first cluster.

11. The method of claim 1, wherein a first priority queue is used in the one or more clusters to record and prioritize one or more tasks for restoring one or more data objects such that:

a first task associated with priority set to be the first data object query-priority is inserted into the first priority queue to query the health information for the one or more replicas of the first data object from one or more locations, in response to determining that the first data object is to be recovered, and a second task with priority set to be the first data object restoration-priority is inserted into the first priority queue to restore the first data object from the one or more available replicas in the one or more locations, in response to determining the restoration-priority for the first data object;

wherein the one or more tasks are extracted from the first priority queue and executed, such that a task with higher priority is executed before a task with lower priority.

12. The method of claim 11, wherein given a first plurality of data objects with health information that is to be queried from the same location or have the same query-priority, optimizing the querying such that a first task for querying health information for a subset of one or more of the first plurality of data objects is inserted as a single task in the first priority queue.

13. The method of claim 11, wherein given a second plurality of data objects that are to be restored from the same location or have the same restoration-priority, optimizing the restoring such that a second task for restoring a subset of one or more of the second plurality of data objects is inserted as a single task in the first priority queue.

* * * * *